Oct. 18, 1966 R. BARHITE 3,278,954

UNCOMPACTED FILLER BATTS

Filed Feb. 12, 1965

INVENTOR.

Robert Barhite

By Dressler, Goldsmith, Clement, Gordon & Ladd

ATTORNEY 3,278,954

UNCOMPACTED FILLER BATTS

Robert Barhite, Pittsford, N.Y., assignor to Union Carbide Corporation, a corporation of New York Filed Feb. 12, 1965, Ser. No. 432,310
10 Claims. (Cl. 5—355)

This invention relates to cushioning and insulation and more particularly to uncompacted batts which are useful to replace feathery filling material in articles requiring softness and good insulating properties.

Feathery materials such as small feathers and down, and particularly eider down and goose down, are particularly desirable for use in pillows, sleeping bags, comforters, insulating jackets and similar articles. In pillows, down is unmatched in buoyancy and softness. In comforters, sleeping bags and jackets, down proves excellent insulation without inhibiting the transmission of body vapors to the outside. For these reasons, down is used in pillows, comforters, packets, and sleeping bags of highest quality despite its scarcity and high price, and despite certain disadvantages incidental to its use.

One of the disadvantages in the use of feathers and down in comforters and jackets is caused by the tendency of the filler material to migrate, bunching up at certain locations within the comforter or jacket while leaving other locations substantially unfilled and uninsulated. To overcome this problem, it has been the custom to use quilting stitches to bring together the opposite sides of the comforter ticking at spaced intervals so that the space within the comforter envelope is compartmentalized and migration of the filler material is limited.

However, even quilting stitches do not entirely solve the migration problem since feathers and down have a tendency to move away from the quilting stitches leaving uninsulated paths on either side of the stitched lines of needle holes for cold air to pass through. For this reason, comforters and jackets intended to be used under conditions of severest cold are made up to two or more separately quilted layers with the quilting stitches staggered so that no uninsulated paths are available for cold air to pass through.

Another disadvantage in the use of feathers and down as filling material is that it is difficult to contain them. Feathers and down work their way through most ticking materials and only the finest and most closely woven tickings can hold them. In addition, pillows, comforters, and other articles containing feathers or down must have multiple stitching at their seams to prevent the feathers or down from passing through the seams.

Still another difficulty in the use of feathers and down is the handling difficulty since feathers and down are awkward to remove from a storage receptacle and awkward to insert into a pillow or comforter envelope.

In accordance with one aspect of this invention the foregoing disadvantages and difficulties are overcome by providing as a filler an uncompacted batt comprising an admixture of staple fibers and feathery tufts, said fibers and tufts being intermingled in a random, three-dimensional arrangement throughout the length, width and depth of the batt, said fibers and tufts being fixedly bonded to adjacent fibers and tufts at spaced points of contact therebetween.

The uncompacted batts described above are prepared in accordance with another aspect of this invention by a method which comprises admixing feathery tufts and staple fibers, forming a batt from said admixture in which said fibers and tufts are intermingled in a random, three-dimensional arrangement throughout the length, width and depth of the batt and bonding said fibers and tufts to adjacent fibers and tufts at spaced points of contact therebetween.

The invention may be more readily understood by reference to the drawings in which.

Figures 1, 2, 3:
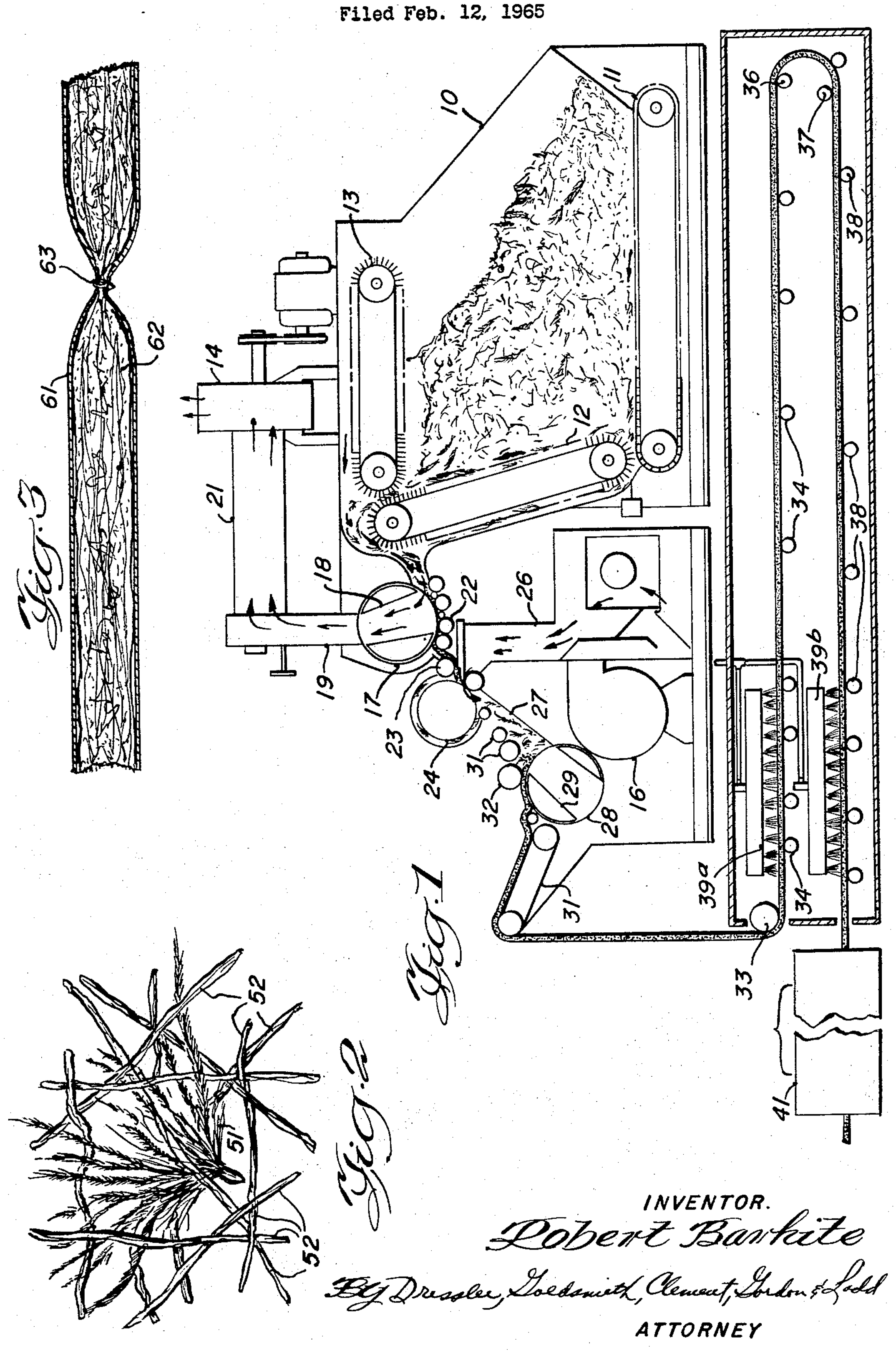
FIGURE 1 shows in schematic elevation, the apparatus used in a specific method of preparing the composite uncompacted batts described above.
FIGURE 2 is an enlarged view of a small portion of the composite uncompacted batt, illustrating its structural make-up.
FIGURE 3 is a sectional view of portion of a quilted comforter containing the composite uncompacted batt.

In a specific embodiment of the method of this invention, described with refreence to FIGURE 1, down and staple fibers in the desired proportions are charged into hopper 10 and moved toward one end thereof (left on FIGURE 1), by creeping apron 11, which is an endless belt having cleats on its surface.

Elevating apron 12 is an endless belt having closely spaced projecting pins on its surface. The moving pins of the elevating apron engage the down tufts and staple fibers moved toward the left end of the creeping apron and elevate them to the proximity of stripper apron 13 which has a pin surface similar to that of the elevating apron. The stripper apron strips away excess tufts and staple fibers and controls the weight of the batt produced.

Suction fan 14 and blower 16 create currents of air which cooperate in laying the feathery tufts and staple fibers togteher in a random batt. The tufts and staple fibers are first picked up by air currents and removed from the elevating apron and laid upon rotating screen 17. Within the rotating screen, there is a stationary air tunnel 18 which is aligned with air ducts 19 and 21 leading to the suction fan.

The tufts and staple fibers laid against screen 17 are moved between the screen and roller conveyor 22 and removed as a layer from contact with screen 17. The layer of tufts and staple fibers passes feed roll 23 and is brought into contact with the rapidly rotating lickerin 24. The action of the lickerin, together with the action of air currents passed from blower 16 through duct 26 breaks up the previously formed layer of tufts and staple fibers and throws them into a random helter-skelter pattern ready for reforming into a random batt.

The tufts and staple fibers move from the lickerin down chute 27 and are laid down as a random layer against rotating screen 28. Stationary air tunnel 29 is located within rotating screen 28 and provides for passage of air through the screen and through the layer of tufts and fibers on the screen.

Guide rolls 31 and feed roll 32 help control the uniformity of the layer formed on screen 28.

The layer of tufts and staple fibers is removed from the rotating screen, passed over delivery conveyor 31 and then passed downwardly in a self-supporting layer or batt around roller 33 and over horizontal conveyor 34.

While passing over conveyor 34, the self-supporting batt of tufts and staple fibers is subjected to a downward spray of liquid adhesive material from nozzles 39*a*. The amount of liquid adhesive material may be relative small, if only the outer portion of the batt is desired to be wetted, or may be relatively large if deep penetration of adhesive is desired.

After being wetted on one side by adhesive, the moving batt is reversed in direction by passage over rollers 36 and 37 and passed over horizontal conveyor 38 which carries it under nozzles 39*b* for a second application of liquid adhesive material and into dryer 41 where the adhesive material is dried and cured to produce bonding at spaced points of contact in the batt.

FIGURE 2 is a much enlarged view of the structure of the uncompacted batt of this invention showing a single feathery tuft 51 in its spatial relationship to a number of staple fibers 52. The staple fibers make contact with each other and with the feathery tuft at a number of spaced points. In those portions of the batt which are reached by adhesive bonds are created at these spaced points of contact which serve to maintain the structure of the batt.

FIGURE 3 is a sectional view of a portion of a quilted comforter including the ticking 61 and the batt 62. It is to be noted that the batt retains its integrity and continuity at the stitching 63 and does not migrate laterally therefrom.

The staple fibers used in the preparation of the uncompacted composite batts may be any natural or synthetic fibrous material of staple length capable of holding the fibers together in a loose batt. Among the suitable staple fibers which may be used are cotton, wool, polyester fibers, cellulose acetate fibers, rayon fibers, nylon fibers, acrylic fibers, modacrylic fibers. The staple fibers may be either crimped or uncrimped, but crimped fibers are preferred.

The staple fibers are preferably between about ¾ inch to about 4 inches long and most preferably from about 1½ inches to about 2 inches long. A suitable range for the denier of the staple fibers is from about 3 to about 22 denier. The preferred fibers have between about 3 and about 15 crimps per inch.

The feathery tufts are preferably down tufts such as eider down, goose down or domestic duck down. Feathers such as goose, duck or chicken feathers may also be used, particularly when chopped to lengths of no more than about one inch. Chicken feathers are ordinarily unsuitable as filler material because of their lack of resiliency, but when composited in a batt with staple fibers in accordance with this invention, chicken feathers become suitable for such use. The term "feathery tuft," as used herein, refers to materials having a plurality of individual fiber-like projections emanating from a single source, whether or not the material is of bird origin. Thus, a feathery tuft may be of vegetable origin, such as dandelion or milkweed tuft.

The proportion of feathery tufts and staple fibers used in the batts may vary considerably since even a small amount of feathery tufts will enhance the buoyancy and insulation properties of a staple batt and even a relatively small amount of staple fibers will help hold feathery tufts together in a batt. From about 30% to about 70% by weight of feathery tufts combined with from about 30% to about 70% by weight of staple fibers may be used satisfactorily with the preferred range being from about 40% to about 60% of each.

The adhesive applied may be any adhesive suitable in bonding uncompacted staple fiber batts, including latices, such as polyvinyl chloride latex, polyvinyl acetate latex, polyacrylic and polymethacrylic ester latices and natural and synthetic rubber latex, thermosetting synthetic resin adhesives, such as phenol-formaldehyde, urea-formaldehyde and melamine formaldehyde adhesives; and cellulosic adhesives, such as cellulose nitrate, cellulose acetate and ethylcellulose.

The amount of adhesive applied may vary depending upon a number of factors including the depth of penetration desired. Usually from about 10% to about 30% by weight of adhesive is applied based upon the weight of the batt.

For most purposes, the adhesive need not penetrate the batt completely since adhesion of tufts and staple fibers to each other in the outer layers of the batt is sufficient to provide the necessary cohesion to the entire batt.

The weight and thickness of the uncompacted batt may vary depending upon the nature of its components and upon the use to which it is to be put. Usually the batts are between about ¼ inch and about one inch in thickness and weigh between about 2 ounces and about 10 ounces per square yard.

If desired, the feathery tufts and staple fibers may be bonded at points of contact by means other than the method described above. For example, all or a portion of the staple fibers may be made up of a low melting thermoplastic material which may be fused in an oven to cause adhesion. Alternatively, all or a portion of the staple fibers may be coated with a low melting thermoplastic material to achieve adhesion by fusion in an oven.

Also, if desired, the quilting of comforters and sleeping bags may be achieved by heat sealing techniques rather than by stitching when the staple fibers are made up of, or are coated with a low melting thermoplastic material.

For use in filling pillows, comforters, jackets or sleeping bags the uncompacted batts are cut to the desired size before insertion into the envelope of the article to be filled. If more than a single thickness of the batt is desired, the cut pieces may be stacked into as many thicknesses as desired before being sealed into the ticking.

The above detailed description of this invention has been given for clearness of understanding only. No unnecessary limitations should be understood therefrom, as modifications will be obvious to those skilled in the art.

I claim:

1. An uncompacted batt comprising an admixture of staple fibers and feathery tufts, said fibers and tufts being intermingled in a random, three-dimensional arrangement throughout the length, width and depth of the batt, said fibers and tufts being fixedly bonded with adhesive to adjacent fibers and tufts at spaced points of contact therebetween.

2. An uncompacted batt comprising an admixture of staple fibers and feathery tufts, said fibers and tufts being intermingled in a random, three-dimensional arrangement throughout the length, width and depth of the batt, a thin coating of a flexible adhesive about at least some of said staple fibers and said tufts, said fibers and tufts being fixedly bonded by said adhesive to adjacent fibers and tufts at spaced points of contact therebetween.

3. The batt of claim 2 wherein said feathery tufts comprise from about 30 to about 70 weight percent of the combined weight of feathery tufts and staple fibers, exclusive of adhesive.

4. An uncompacted batt comprising an admixture of staple fibers and feathery goose down tufts, said fibers and tufts being intermingled in a random, three-dimensional arrangement throughout the length, width and depth of the batt, said fibers and tufts being fixedly bonded with adhesive to adjacent fibers and tufts at at least some of the spaced points of contact therebetween.

5. An uncompacted batt comprising an admixture of staple fibers and feathery tufts, said fibers and tufts being intermingled in a random, three-dimensional arrangement throughout the length, width and depth of the batt, a thin coating of a flexible adhesive about said staple fibers and said tufts in the outermost portion of said batt, said fibers and tufts in said outermost portion being fixedly bonded by said adhesive to adjacent fibers and tufts at spaced points of contact therebetween.

6. The batt of claim 2 wherein said staple fibers are between about ¾ inch and about 4 inches in length.

7. A method of preparing an uncompacted batt which comprises admixing feathery tufts and staple fibers, air laying said admixture to form a batt from said admixture in which said fibers and tufts are intermingled in a random, three-dimensional arrangement throughout the length, width and depth of the batt and bonding said fibers and tufts to adjacent fibers and tufts at spaced points of contact therebetween.

8. A method of preparing an uncompacted batt which comprises admixing feathery tufts and staple fibers in a proportion comprising from about 30 to about 70 weight percent of feathery tufts, air laying said admixture to form a batt from said admixture in which said fibers and tufts are intermingled in a random, three-dimensional arrangement throughout the length, width and depth of the batt and bonding said fibers and tufts to adjacent fibers and tufts at at least some of the spaced points of contact therebetween.

9. A pillow comprising a ticking and containing, as filler material, an uncompacted batt comprising an admixture of staple fibers and feathery tufts, said fibers and tufts being intermingled in a random, three-dimensional arrangement throughout t helength, width and depth of the batt, said fibers and tufts being fixedly bonded with adhesive to adjacent fibers and tufts at spaced points of contact therebetween.

10. A comforter, comprising a ticking and containing, as filler material, an uncompacted batt comprising an admixture of staple fibers and feathery tufts, said fibers and tufts being intermingled in a random, three-dimensional arrangement throughout the length, width and depth of the batt, said fibers and tufts being fixedly bonded with adhesive to adjacent fibers and tufts at spaced points of contact therebetween.

References Cited by the Examiner

UNITED STATES PATENTS

| | | | |
|---|---|---|---|
| 1,201,554 | 10/1916 | Burton | 5—337 |
| 1,583,334 | 5/1926 | Bloom | 5—355 |
| 1,642,557 | 9/1927 | Reynolds | 5—355 |
| 2,574,849 | 11/1951 | Talalay | 161—170 |
| 2,742,652 | 4/1956 | Mautz | 5—355 |
| 3,081,207 | 3/1963 | Fox | 156—62.4 |

FOREIGN PATENTS

| | | |
|---|---|---|
| 977,872 | 12/1964 | Great Britain. |

FRANK B. SHERRY, *Primary Examiner.*

CASMIR A. NUNBERG, *Examiner.*